United States Patent [19]
Kawai

[11] Patent Number: 6,038,268
[45] Date of Patent: Mar. 14, 2000

[54] DIRECT CONVERSION FSK SIGNAL RADIO RECEIVER

[75] Inventor: Kazuo Kawai, Tokyo, Japan

[73] Assignee: General Research of Electronics, Inc., Tokyo, Japan

[21] Appl. No.: 08/802,161

[22] Filed: Feb. 14, 1997

[30] Foreign Application Priority Data

Feb. 15, 1996 [JP] Japan .................................. 8-052321

[51] Int. Cl.[7] .................................................. H04L 27/14
[52] U.S. Cl. .......................... 375/334; 375/326; 375/345; 329/300
[58] Field of Search ................................. 375/272, 278, 375/326, 334, 344, 345; 329/300

[56] References Cited

U.S. PATENT DOCUMENTS

| | | | |
|---|---|---|---|
| 5,091,921 | 2/1992 | Minami | 375/334 |
| 5,263,194 | 11/1993 | Ragan | 455/316 |
| 5,414,736 | 5/1995 | Hasegawa et al. | 375/334 |
| 5,446,762 | 8/1995 | Ohba et al. | 375/334 |

*Primary Examiner*—Tesfaldet Bocure
*Attorney, Agent, or Firm*—Trexler, Bushnell, Giangiorgi & Blackstone, Ltd.

[57] ABSTRACT

In this disclosure, a single combination of a multiplier and amplifier is utilized in a time-sharing manner for two-axis, in-phase an orthogonal phase components (I-axis and Q-axis components, respectively) so that the problem of a phase error relating to the use of the two separate circuits which are used for the respective two-axis components cannot be produced. Further, in this disclosure, this amplifier is constructed as a variable gain amplifier for the purpose of the application of AGC (automatic gain control) through the use of signal power obtained form the amplifier output, and any DC offset is automatically corrected using detecting and correcting means. After a process has been made in which the two-axis components are separated from the amplifier output, frequency detection is made by a frequency detector with linear frequency detection characteristics, which carries out a calculating operation of the separated two-axis components, and an output signal is provided by two-value judging the demodulated output thus obtained. Further, by carrying out comparison between the input and output of the two-value judging circuit, any center frequency error of the FSK signal is detected irrespective of code contents of the FSK signal, and the frequency of the local carrier for the direct conversion is controlled using the thus detected frequency error output.

9 Claims, 2 Drawing Sheets

DIRECT CONVERSION FSK SIGNAL RADIO RECEIVER

BACKGROUND OF THE INVENTION

This invention relates to a novel circuit constructing technique for direct conversion reception in a signal radio receiver. More particularly, the present invention relates to a novel circuit constructing technique for direct conversion reception in a FSK (Frequency Shift Keying) signal radio receiver.

In a conventional FSK signal radio receiver, generally, a high-frequency signal which was received by the receiver through its antenna is converted in frequency to an IF (Intermediate Frequency) signal using a superheterodyne system, and the IF signal thus frequency-converted is frequency detected by a frequency discriminator. This method can provide the major portion of amplification degree and selectivity requisite for the receiver, only in the IF amplifier stage. However, with this method, there is the problem that in order to avoid image frequency disturbance which would be produced, an increase of the selectivity of a high-frequency amplifier stage is needed to a some extent, which may be provided at a receiver stage preceding the heterodyne frequency-converting stage, and therefore its structure becomes inevitably more complex as the the reception band of the receiver, within which FSK signal frequencies can be received, is widened. Moreover, the tuned frequency tracking at each of the high-frequency amplifiers in the high-frequency amplifier stage and a local oscillator becomes much more difficult.

By contrast, in recent years, a direct conversion receiving method has been put to practical use, which is suitable especially for the reception of a FSK signal, since a radio receiver for the FSK signal can be constructed quite simply. This is based on the reason that in the direct conversion system, the received signal by the receiver is directly frequency-converted, or dropped in frequency, to the frequency of its base band signal (this means here a signal of which center frequency is merely beaten down to zero, not the base band signal which is the modulation signal). As a result, two axis component signals (in-phase and orthogonal phase) are produced, and these signals are amplified respectively. The phase difference between these two signals is $+\pi/2$ or $-\pi/2$, depending upon whether they are high or low in frequency with respect to the center frequency of the input signal, which has its phase value which is a two-level value.

In the case of the FSK signal, since information carried by the FSK signal is in itself the two-level value, in its demodulation, the two-level value which the base band signal phase has can be used directly. Furthermore, in the case of the FSK signal, since, as to a phase error between amplifiers for both the base band signal components, a limiter can be used to limit the input signal, additionally, its output, which is in the form of a rectangular waveform, can be reproduced merely by means of direct logical judgment, and therefore it is possible to construct a receiver with extreme ease for such.

Following the development of the direct conversion FSK signal receiving system, dedicated LSI (Large Scale Integration) circuits for the FSK signal radio receivers, according to the direct conversion FSK signal system, have been put to practical use. However, the input signal is directly converted, amplified and then demodulated using a logical circuit, without the use of an AFC (Automatic Frequency Control) circuit for correcting any frequency error in the input signal or local carriers. As for an AFC for the FSK signal, it is required that the AFC operate with respect to the center frequency of the FSK signal. However, usual AFC circuits, which are used widely at present, merely operate so as to make any frequency error equal to zero at every moment. Therefore, if the AFC signal is modulated so that it continues for a long time at one of its two frequencies, the AFC is inevitably captured to its frequency. Accordingly, in case where the conventional AFC circuits would be utilized with the direct conversion FSK receiver LSI circuits, as they are, the error code rate would be increased depending upon the contents of modulated codes.

Until now, various LSI circuits have been developed for simplifying the construction of a direct conversion FSK signal radio receiver. However, such LSI circuits can be used only in case where there is not reception frequency error. If there is a frequency error, code distortion would be produced and the noise margin would be decreased. Even though a typical AFC was applied to such construction in order to improve the disadvantage, many character errors were produced. Since the FSK signal itself varies its frequency due to modulation, the AFC can follow the moving average value, and in the case of a long code, the AFC can be captured to that frequency, and as a result many character errors were produced.

In view of the above, the present invention is intended to solve the above problems with very simple means, and to provide a direct conversion FSK signal receiver having a stable reception operation all the time.

OBJECTS AND SUMMARY OF THE INVENTION

A general object of the present invention is to provide a novel circuit constructing technique for direct conversion reception in a FSK (Frequency Shift Keying) signal radio receiver.

A more particular object is to provide means for solving the above-mentioned problems relating to the prior art, that is for exhibiting an AFC function by which the center frequency of a FSK signal is followed correctly regardless of the contents of modulated codes.

Yet a further object is constructing a FSK signal radio receiver according to the direct conversion system, giving simplicity in structure, so that materialization of a direct conversion FSK signal receiver which operates stably at all times is intended to be achieved.

In order to achieve the above object, this invention avoids the use of two separate multiplier/amplifier combinations for the two-axis components, that is in-phase and orthogonal phase components (I-axis and Q-axis components, respectively), and in place thereof a single combination of a multiplier and amplifier is utilized in a time-sharing manner for the two-axis components so that the problem of a phase error relating to the use of the two separate circuits which are used for the respective two-axis components cannot be produced. Further, in this invention, this amplifier is constructed as a variable gain amplifier for the purpose of the application of AGC (Automatic Gain Control) through the use of signal power obtained from the amplifier output, and any DC offset is automatically corrected using its detecting and correcting means. After the two-axis components have been separated from the amplifier output, frequency detection is made by a frequency detector with linear frequency detection characteristics, which calculates the separated two-axis components, and an output signal is provided by two-value judging the demodulated output thus obtained. Further, by carrying out comparison between the input and output of the two-value judging circuit, any center frequency error of the FSK signal is detected irrespective of code contents of the FSK signal, and the frequency of local carriers for the direct conversion is controlled using the thus detected frequency error output. With this invention, since in the demodulation of the FSK signal, stable direct conversion reception is made possible, an FSK receiver having no image interference can be fabricated with a simple construction.

Other objects, features and advantages of the invention will become apparent from a reading of the specification, when taken in conjunction with the drawings.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENT

Figure 1:
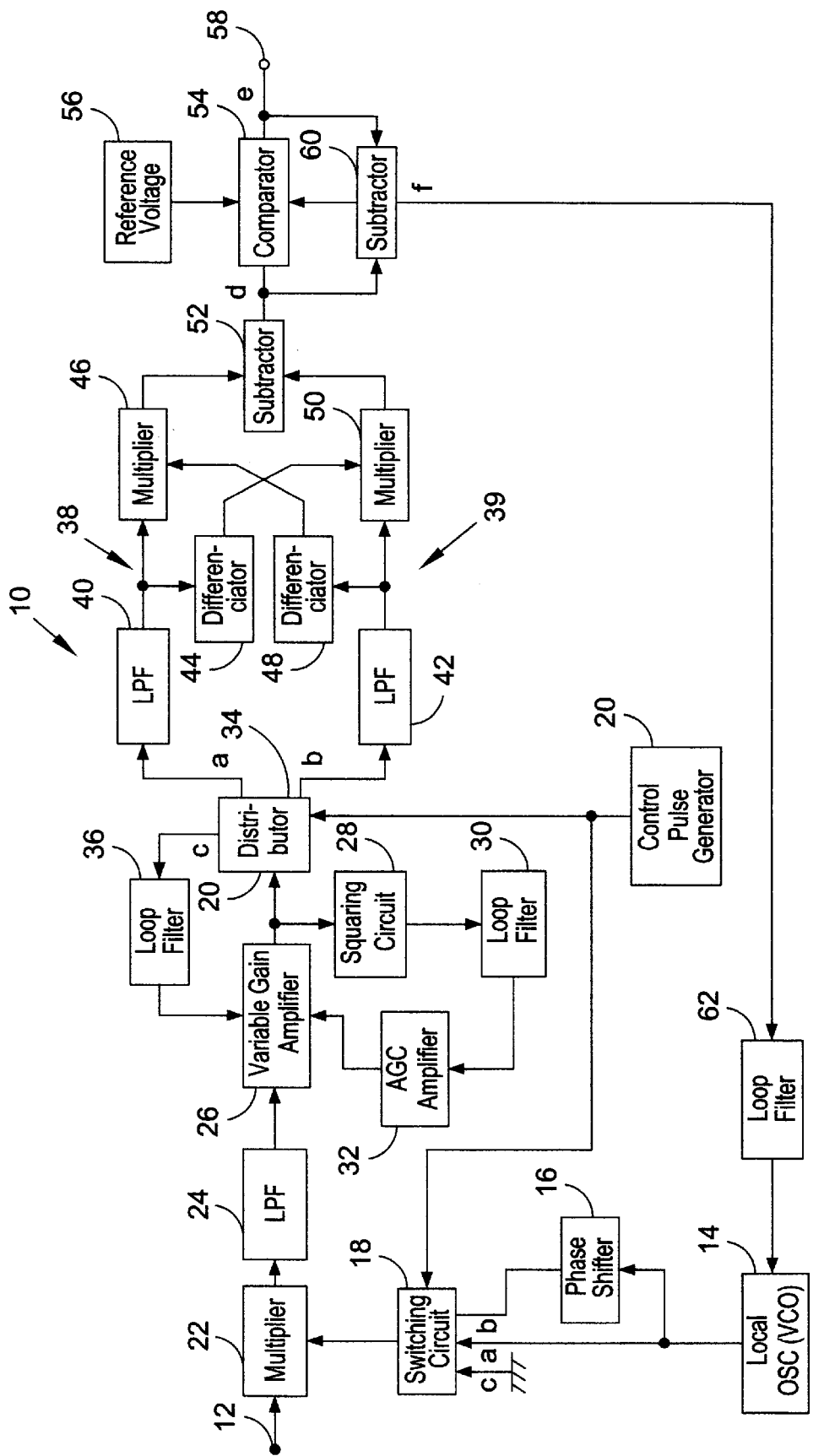
FIG. 1 is a block diagram showing a direct conversion FSK receiver according to one embodiment of this invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The present invention is directed to a novel circuit constructing technique for direct conversion reception in a FSK (Frequency Shift Keying) signal radio receiver.

Referring now to FIG. 1, there is shown a block diagram of the main part of a direct conversion FSK receiver according to one embodiment of this invention, generally designated 10, which includes an input terminal 12 which is adapted to receive an FSK signal from a high frequency circuit of the receiver, which may include a high-frequency amplifier stage. The circuit 10 includes a local oscillator 14, in the form of a voltage controlled oscillator (VCO), having a control input for generating a carrier wave of a frequency which is adapted to be equal to the center frequency of the input FSK signal, along with a phase shifter 16 for shifting the carrier wave from the local oscillator 14 by a phase of π/2.

A switching circuit 18 is also provided in the circuit 10, having two inputs "a" and "b", one input "a" directly receiving the carrier wave from the local oscillator 14, and the other input "b" receiving the π/2 phase-shifted carrier wave from the π/2 phase shifter 16, said switching circuit 18 also having a third input "c" directly coupled to the earth or ground. The switching circuit 18 is controlled by a control pulse signal from a control pulse generating circuit 20 as will be explained in detail hereinafter.

The circuit 10 also includes a multiplier 22 which multiplies the input FSK signal at the input terminal 12 by an output from the switching circuit 18, a low-pass filter 24 receiving the output of the multiplier 22, and a variable gain amplifier 26 receiving the output of the low-pass filter 24 and having a relevant feedback loop circuit. The relevant feedback circuit comprises a squaring circuit 28 having its input connected to the output of the variable gain amplifier 26, a loop filter 30 of which input is connected to the output of the squaring circuit 28, and an AGC (Automatic Gain Control) amplifier 32 having its input receiving the output of the loop filter 30 and its output connected to the control input of the variable gain amplifier 26.

A distributing circuit 34 is also included in the circuit 10, having an input connected to the output of the variable gain amplifier 26 and three outputs "a", "b" and "c", with "a" connected to a first low-pass filter 40, "b" connected to a second low-pass filter 42, and "c" connected to a loop filter 32 of which output is fed back to the gain control input of the variable gain amplifier 26.

The first low-pass filter 40 constitutes a first calculating circuit 38 together with a differentiator 44 and a multiplier 46, and the second low-pass filter 42 constitutes a second calculating circuit 39 together with a differentiator 48 and a multiplier 50, respectively. In the first calculating circuit 38, the output of the low-pass filter 40 is coupled to the input of the differentiator 44 and one input of the multiplier 46. In the second calculating circuit 39, the output of the low-pass filter 42 is coupled to the input of the differentiator 48 and one input of the multiplier 50. The output of the first differentiator 44 is connected to the other input of the multiplier 50 in the second calculating circuit 39, while the output of the second differentiator 48 is connected to the other input of the multiplier 46 in the first calculating circuit 38. Therefore, the multipliers 46 and 50 in the first and second calculating circuits 38 and 39, respectively, each multiply the output of the related low-pass filter 40, 42 and the differentiated output of the other low-pass filter 42, 40, together. The outputs of the multipliers 46 and 50 are applied to respective inputs of a subtracter 52 in order to carry out subtracting operation therebetween.

The output of the subtracter 52 is applied to a comparator 54 as its one input "d", the other input which the comparator 54 receives is from a reference comparison voltage from a reference voltage source 56. The output "e" of the comparator 54 is led to a demodulated signal output terminal 58. Between the input "d" and output "e" of the comparator 54 which receives the output from the subtracter 52, a subtracter 60 is coupled, the output "f" of which is applied to the voltage controlled oscillator 14 through a loop filter 62 as its control input.

In operation, the input FSK signal applied to the input terminal 12 is applied to the multiplier 22 which multiplies it by the output signal of the switching circuit 18. The switching circuit 18 receives, in order, the outputs of the local oscillator or voltage controlled oscillator 14 and of the phase shifter 16, which are alternately switched at a sufficiently higher frequency than that of the base band signal of the input signal to be applied to the multiplier 22, in response to the output pulse signal from the control pulse generating circuit 20. The multiplier 22 provides an output signal comprising two alternate components, one output being of the sum of the input signal frequency at the input terminal 12 and the output signal frequency from the switching circuit 18 (it is equal to the center frequency of the input FSK signal), and the other output being of the difference therebetween. The low-pass filter 24 receives the output signal of the multiplier 22 and provides a signal comprising only the difference component as a base band signal (in the form of a sample shaped by the switching) which will be processed by the remaining circuit elements.

Now, it is assumed that the output of the local oscillator 14 is $\cos(\omega_0 t)$, the output of the phase shifter 16 is cos $$\cos\left(\omega_0 t + \frac{\pi}{2}\right),$$

and the input FSK signal with its frequency shifted to the positive is $A\cos(\omega_0 t + \Delta\omega t + \theta)$. Also, it is assumed that the derived function of the switching circuit 18 at the local oscillator 14 side (waveform in case where "a" is selected) is $\Re t$, and the derived function of the switching circuit 18 at the phase shifter 16 side (waveform in case where "b" is selected) is its inverted form, that is $\overline{\Re(t)}$. Then, the output $M_5(t)$ from the multiplier 22 which is obtained from the multiplication by the multiplier 22 is expressed by the following expression (1):

$$M_5(t) = A\cos(\omega_0 t + \Delta\omega t + \theta)\left\{\cos(\omega_0 t)\cdot\Re(t) + \cos\left(\omega_0 t + \frac{\pi}{2}\right)\cdot\overline{\Re(t)}\right\} \quad (1)$$

The output $P_H(t)$ from the low-pass filter 24 which comprises only the difference component selectively passed by the low-pass filter 24 is expressed by the following expression (2):

$$P_H(t) = A\left\{\cos(\Delta\omega t + \theta)\cdot\Re(t) + \cos\left(\Delta\omega t + \theta - \frac{\pi}{2}\right)\cdot\overline{\Re(t)}\right\} \quad (2)$$

Next, the output $P_L(t)$ of the low-pass filter 24 at the time when the input FSK signal became $A\cos(\omega_0 t + \Delta\omega t + \theta)$ by the fact that its frequency was shifted to the negative is expressed by the following expression (3):

$$P_L(t) = A\left\{\cos(\Delta\omega t - \theta)\cdot\Re(t) + \cos\left(\Delta\omega t + \theta - \frac{\pi}{2}\right)\cdot\overline{\Re(t)}\right\} \quad (3)$$

The output signal from the low-pass filter 24 is supplied to the variable gain amplifier 26 to be amplified, and then to the distributing circuit 34. In the illustrated embodiment, the distributing circuit 34 is controlled by the same control pulse signal as that supplied to the switching circuit 18 from the control pulse generator 20. Therefore, time "a" of a distributing sequence corresponds in time to time "a" of the switching circuit 18 output sequence during which the carrier wave from the VCO 14 is outputted from the switching circuit 18, and the distributing circuit 34 provides the output from the variable gain amplifier 26 to the first low-pass filter 40. Similarly, time "b" of a distributing sequence corresponds in time to time "b" of the switching circuit 18 output sequence during which the $\pi/2$ phase-shifted carrier wave from the $\pi/2$ phase shifter 16 is outputted from the switching circuit 18, and the distributing circuit 34 provides the output from the variable gain amplifier 26 to the second low-pass filter 42.

In accordance with the operation of the illustrated embodiment, when the distributing circuit 34 connects output "a" to the first low-pass filter 40, a signal representative of the first term of the expression (2) or (3), respectively is applied to the low-pass filter 40, and when the distributing circuit 34 connects output "b" to the low-pass filter 42, a signal representative of the second term of the expression (2) or (3), respectively is applied to the low-pass filter 42. Since the low-pass filters 40 and 42 cannot respond to the speed of $\Re(t)$ or $\overline{\Re(t)}$, respectively (therefore, these are smoothed by the low-pass filters, respectively), the signals representative of the first and second terms, respectively, that is the in-phase component and orthogonal component, respectively can be completely separated and extracted.

In the usual demodulation of the FSK signal according to the direct conversion receiver system, it has been simply demodulated by merely detecting $-\pi/2$ which is the difference between the first and second terms of the expression (2) or $+\pi/2$ which is the difference between the first and second terms of the expression (3) by a conventional logical decision circuit. This method can correctly demodulate the FSK signal if there is no frequency error between the input signal and the local carrier wave. However, if there is any such error, it becomes signal distortion, and as such it increases the rate of error codes because of the decrease of noise margin. Further, if such frequency error rises above the shift frequency, it becomes impossible to carry out the demodulation.

In accordance with this invention, even where there is such a large frequency error, it can be detected and corrected automatically. Also, an AFC system as used, recognizes such frequency error as an error which is based with respect to the center frequency of the FSK signal, and is not sensitive to the contents of modulation codes. For this, a frequency detector is furnished providing a detected output which is proportional to the shift frequency, that is one having linear frequency detection characteristics.

The second terms of the expressions (2) and (3) are $\sin(\Delta\omega t + \theta)$ and $-\sin(\Delta\omega t - \theta)$, respectively, and as explained above, the low-pass filter 40 provides an output of $A\cos(\Delta\omega t \pm \theta)$, and the low-pass filter 42 provides an output of $\pm A\sin(\Delta\omega t \pm \theta)$. In this case, any loss resulting from the smoothing of $\Re(t)$ and $\overline{\Re(t)}$, and amplification gain of the variable gain amplifier 26 are ignored. The multiplier 46 in the first calculating circuit 38 receives the output of the low-pass filter 40 and the output of the differentiator 48 from the second calculating circuit 39, which differentiates the output of the second low-pass filter 42, and multiplies these outputs together. On the other hand, the multiplier 50 in the second calculating circuit 39 receives the output of the low-pass filter 42 and the output of the differentiator 44 from the first calculating circuit 38, which differentiates the output of the first low-pass filter 40, and multiplies these outputs together. Therefore, when the input FSK signal was shifted to $+\Delta\omega$ in frequency, the output of the multiplier 46 becomes $(A/2)\cdot\Delta\omega\cdot\cos^2(\Delta\omega t + \theta)$, and the output of the multiplier 50 becomes $(-A/2)\cdot\Delta\omega\cdot\sin^2(\Delta\omega t + \theta)$. Since $\cos^2 x + \sin^2 x = 1$, the subtracter 52 produces its output, $A\cdot\Delta\omega$. In the same manner, when the frequency of the input FSK signal was shifted to $-\Delta\omega$, an output signal $-A\cdot\Delta\omega$ can be obtained by the subtracter 52 at its output. Thus, the subtracter 52 provides to its output a demodulated output which is proportional to the signal amplitude and frequency shift.

The signal which has been frequency-detected is applied from the subtracter 52 to a level comparator 54 for comparing it with a reference voltage in the reference voltage source 56. Therefore, the subtracter 52 output is shaped into a two-value signal by the comparator 54, and is applied to the demodulated signal output terminal 58.

Since the demodulated output is proportional to $A\cdot\Delta\omega$, the signal amplitude A should be kept constant. Since the FSK signal is the two-level signal, a limiter can be used. However, in the present embodiment, a limiter can not be utilized in materializing the frequency detector which has linear frequency characteristics because the differentiation is needed in the course of the demodulation in the FSK signal, as explained above.

In order to cope with the aforementioned problem, the present invention makes use of an AGC (Automatic Gain Control). In general, to apply the AGC, the amplitude of the signal must be detected, and therefore, in the case of the two-axis detection, to detect the signal amplitude A in the operation of $A=\sqrt{X^2+Y^2}$ (wherein X represents the magnitude of the in-phase axis component and Y represents the magnitude of the orthogonal phase axis component). However, in order to apply the AGC, all that is required is that $A^2$ be a predetermined value (that is, the actual value of A need not be determined), as such, A may be left squared. The squaring circuit 28 in the illustrated embodiment is provided for this purpose.

As can be understood for a fact, proved explanation, the squaring circuit 28, in fact, produces at its output $X^2\overline{\Re(t)}+Y^2\overline{\Re(t)}$. From the expression (2), $X^2$ and $Y^2$ are $A^2\cos^2(\Delta\omega t+\theta)$ and $A^2\sin^2(\Delta\omega t+\theta)$, respectively, and $\Re(t)$ and $\overline{\Re(t)}$ are smoothed by the loop filter 30, and further the operation of $\cos^2(x)+\sin^2(x)=1$ is carried out automatically at the same time. Therefore, the loop filter 30 provides at its output a voltage of the magnitude of $A^2/2$. This voltage is not proportional to the signal amplitude, but rather to the signal power. However, if it is a constant value, it can be utilized directly to control the gain of the variable gain amplifier 26 through the AGC amplifier 32.

In the direct conversion receiver, the portion of amplification is given rise to in its base band amplifier part. In FIG. 1, this amplifier part corresponds to the stage of the variable gain amplifier 26. Since the base band signal of a FSK signal includes a DC component as well, this amplifier must be constructed as a DC amplifier which can amplify a frequency range having a DC component. However, in such DC amplifiers, a DC offset would be usually produced, which could have some influence on the detection of the signal power for the AGC operation.

Accordingly, in this invention, such DC offset is corrected as follows. As explained above, the switching circuit 18 switches in sequence its inputs, "a" (the output of the VCO 14), "b" (the output of the π/2 phase shifter 16) and "c" (the ground level), in response to the control signal from the control signal generator 20, so that it provides as its output a serial iteration stream consisting of the "a", "b" and "c" inputs, in order, to the switching circuit 18. When the input of the switching circuit 18 is connected to the ground level "c" in an iteration sequence, this level is transmitted to the distributor 34 through the multiplier 22, low-pass filter 24 and variable gain amplifier 26, and switched out therefrom during the same switching time "c". Therefore, at the output of the distributor 34, an intermittent waveform representing a DC offset component of the whole system appears. This intermittent waveform is smoothed by the loop filter 36 and applied to the variable gain amplifier 26 so that its offset can be controlled in a negative feedback manner. The control system can control the integrated offset so that it becomes minimum. It is appreciated that the negative feedback of the offset component thus detected may be applied to any stage such as the switching, converting, amplifying, distributing, etc. Incidentally, it should be noted that the sequence of "c" may be repeated more slowly than that of "a" and "b".

As stated above, a usual AFC circuit follows the mean value of moving of the modulation code for a FSK signal. Therefore, it can shift in accordance with the mean value of moving, though the center frequency of the FSK signal does not move, and accordingly, many more error characters would be produced by the AFC. Consequently, in order to perform the complete reception of a FSK signal, an AFC circuit which can follow accurately the center frequency of the FSK signal is required One method of detecting the center frequency of the FSK signal, the means disclosed in the Japanese Patent Prepublication No. 235954/1995 (title: A demodulation correcting circuit for a FSK radio receiver), of which the inventor is the same as in the present application, can be applied to the disclosed embodiment according to this invention. Hereinafter, an operation as to where this method was applied to in the circuit in FIG. 1 will be explained using waveforms schematically shown in FIG. 2.

Figure 2A:
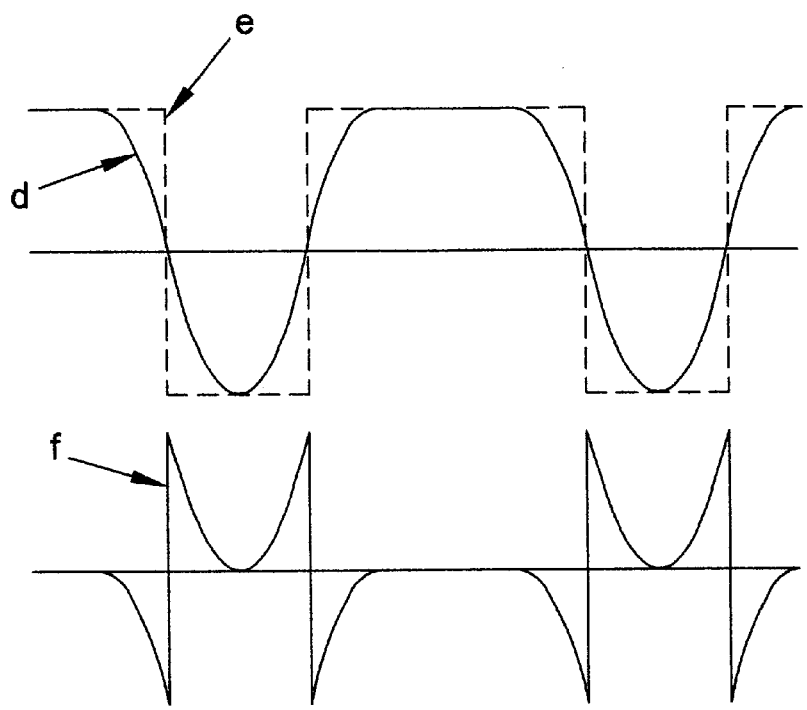
FIGS. 2a and 2b show waveform views for explaining the operation of the circuit in FIG. 1.

Subtracter 60 and loop filter 62 constitute a circuit for detecting any error of the center frequency of the FSK signal. The subtracter 60 has an input "d" which is the output of the subtracter 52, and an input "e" which is the output of the comparator 54. The subtracter 60 has an output "f" which is coupled to the input of low-pass filter 62 having its output coupled to the control input of the VCO 14. FIG. 2a shows examples of these waveforms "d", "e" and "f" at the time when the frequency error is equal to zero.

Figure 2B:
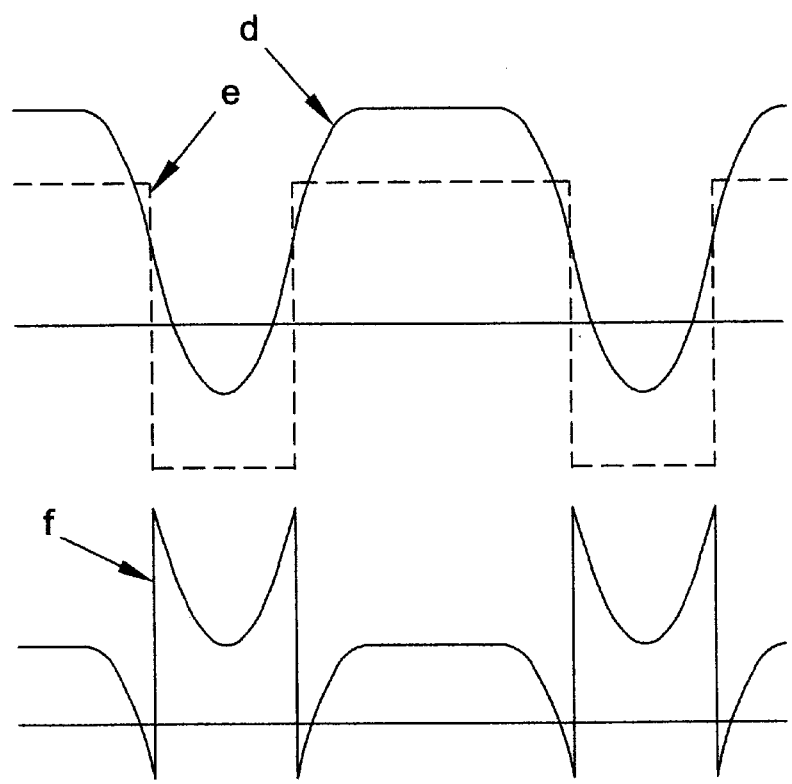

As is clear from FIG. 2a, the amplitude of the waveform "d" has been set to be equal to that of the waveform "e", as there is no error on the center frequency of the FSK signal, no control voltage is produced at the output of the loop filter 62 which filters the subtracter 60 output waveform "f", irrespective of the contents of codes. FIG. 2b shows the waveforms in the case wherein the center frequency error is comparatively large. It is appreciated that after this waveform "f" was filtered through the loop filter 62, a DC control voltage is provided therefrom, which corresponds to a frequency error. Thus, since it is possible to detect any error of the center frequency under no influence of the code contents, the frequency generated by the VCO 14 can be correctly maintained.

Accordingly, with this invention, in which a common multiplier and amplifier are used in a time-sharing manner with respect to both the in-phase and orthogonal components of a FSK signal, it is possible to process the FSK signal using a single converter and amplifier, and thereby carry out the conversion and amplification, in producing and amplifying both the in-phase and orthogonal components, without any phase error. Further, by constructing the amplifier as a variable gain amplifier for maintaining signal amplitude constant through the automatic control of the signal gain, and after the separation of both of these components, and by multiplying a respective one of these components by a respective differentiated one of the other component mutually and finding the difference between the resulting multiplied outputs, it is possible to provide a liner frequency detector for demodulating the FSK signal. By using this demodulated output and its logic judgment output, any frequency error of the FSK signal can be detected under no influence of the contents of demodulated codes of the FSK signal, thereby making it possible to have an AFC system which is suitable for the FSK signal. With this manner, it is possible to provide a simple FSK radio receiver which can always maintain a stable receiving operation.

While preferred embodiment of the present invention is shown and described, it is envisioned that those skilled in the art may devise various modifications of the present invention without departing from the spirit and scope of the appended claims.

What is claimed is:

1. A direct conversion FSK signal radio receiver comprising:

converter means for directly converting a received FSK signal into a base band signal;

local oscillator means for generating an in-phase local carrier;

shift means for producing an orthogonal phase carrier on the basis of said in-phase local carrier;

switching means coupled to said converter means, said converter means capable of receiving said local carriers of in-phase and orthogonal phase, as well as ground potential, said switching means sequentially switching and supplying one of said in-phase, said orthogonal phase, or said ground potential to said converter means per switch of said switching means;

variable gain amplifier means for amplifying the base band signal provided from said converter means, providing an amplified output;

distributing means to distribute said amplified output into three outputs;

said switching means and said distributing means both being synchronously switched together at a rate which is higher than that of said base band signal;

said three outputs from said distributing means each being filtered respectively to provide both base band signals on said in-phase and said orthogonal phase and a detected DC offset component integrated through the switching, converting, amplifying and distributing stages, respectively;

said DC offset component being negatively feedbacked to any one of said switching, converting, amplifying and distributing stages to correct any DC offset;

negative feedback means to convert said output of said variable gain amplifier means into signal power which is negatively feedbacked to control the gain of said variable gain amplifier means making said both base band signals of in-phase and said orthogonal phase accurate;

said base band signals of in-phase and orthogonal phase being multiplied by their differentiated base band signals of orthogonal phase and in-phase, respectively, providing respective multiplied results;

said both multiplied results being subtracted for frequency discrimination with linear characteristics, providing a subtracted result;

said subtracted result being compared with a reference level to provide a demodulated output of the FSK signal, which is reformed into a two-value logical voltage level; and said subtracted result and said demodulated output of the FSK signal being subtracted to provide a difference, said difference is transformed into a control signal representing any frequency error between the center frequency of said input FSK signal and said in-phase local carrier, said control signal controlling said local oscillator means so that an AFC operation is carried out irrespective of the code contents of modulation of said FSK signal.

2. The direct conversion FSK radio receiver of claim 1, wherein said converter means comprises:

a multiplier, said multiplier coupled to receive said FSK signal and one of said supplied signals from said switching means per switch, for multiplying said received FSK signal by said supplied signal from said switching means, providing a multiplied result; and a low-pass filter coupled to receive said multiplied result from said multiplier for providing said directly frequency converted base band signal of said received FSK signal.

3. The direct conversion FSK signal radio receiver of claim 1, wherein said local oscillator means is comprised of a voltage controlled oscillator wherein the generated frequency is controlled by said control signal.

4. The direct conversion FSK signal radio receiver of claim 1, wherein said negative feedback means comprises:

squaring circuit means for squaring the output of said variable gain amplifier means;

filtering means for smoothing the output of said squaring means; and

AGC amplification means to control the gain of said variable gain amplifier means.

5. The direct conversion FSK signal radio receiver of claim 1, wherein said switching means and said distributing means both being synchronously switched together at a rate which is higher than that of said base band signal is accomplished by utilizing a control pulse generator coupled to both said switching means and said distributing means.

6. A method for the direct conversion of an FSK signal, said method comprising the steps of:

converting a received FSK signal into a base band signal with a converter means;

generating an in-phase local carrier and an orthogonal phase carrier, said orthogonal carrier generated on the basis of said in-phase local carrier;

sequentially switching and supplying one of said in-phase, said orthogonal phase, or ground potential to said converter means per switch;

amplifying the base band signal provided from said converter means with a variable gain amplifier means providing an amplified output;

distributing said amplified output into three outputs, said distributing step being synchronous with respect to said sequential switching step and at a rate which is higher than that of said base band signal;

filtering said three outputs, each being filtered respectively to provide both base band signals on in-phase and orthogonal phase and a detected DC offset component integrated through the switching, converting, amplifying and distributing stages respectively;

supplying a negative feedback to any one of said switching, converting, amplifying and distributing stages to correct any DC offset;

converting said amplified output into signal power which is negatively feedbacked to control the gain of said variable gain amplifier means;

multiplying said base band signals of in-phase and orthogonal phase being by their differentiated base band signals of orthogonal phase and in-phase, respectively;

subtracting said both multiplied results for frequency discrimination with linear characteristics providing a primary subtracted result;

comparing said primary subtracted result with a reference level to provide a demodulated output of the FSK signal, which is reformed into a two-value logical voltage level; and subtracting said primary subtracted result from said demodulated output of the FSK signal to provide a difference between these two waveforms which controls a frequency of said in-phase local carrier, which is then treated to provide a control signal representing any frequency error between the center frequency of the input FSK signal and said in-phase local carrier, said control signal controlling said local carrier generating step so that an AFC operation is carried out irrespective of the code contents of modulation of the FSK signal.

7. The method for the direct conversion of an FSK signal of claim 6, wherein said step of converting a received FSK signal into a base band signal comprises:

multiplying said received FSK signal by said supplied signal from said switching means, providing a multiplied result; and filtering said multiplied result providing said directly frequency converted base band signal of said received FSK signal.

8. The method for the direct conversion of an FSK signal of claim 6, wherein said step of converting said amplified output into signal power which is negatively feedbacked to control the gain of said variable gain amplifier means comprises:

squaring the output of said variable gain amplifier means;

filtering and smoothing the output of said squaring means; and applying an AGC amplification means to control the gain of said variable gain amplifier means.

9. The method for the direct conversion of an FSK signal of claim 6, wherein said step of sequentially switching and supplying one of said in-phase, said orthogonal phase, or ground potential to said converter means per switch is accomplished by applying a common control pulse to both said switching means and said distributing means.

* * * * *